Patented May 17, 1932

1,858,905

UNITED STATES PATENT OFFICE

NICHOLAS A. RUMANCEFF, OF NEW YORK, N. Y.

COMPOSITION FOR TREATING ARTERIOSCLEROSIS AND METHOD OF PREPARING SAME

No Drawing.  Application filed June 27, 1929.  Serial No. 374,302.

This invention relates to an improved composition for the treatment of arteriosclerosis or calcinosis, and includes not only the new composition, but also an improved method of making it and sealed ampules containing it.

Arteriosclerosis or hardening of the arteries is a widely spread and often fatal disease. Investigations have indicated that in cases of arteriosclerosis proper there is a diffusive hyperplasia and a process of calcium deposition in the peripheral vessels, i. e. a process of calcinosis. With increase in age, the content of alkali metal salts in the blood tends to decrease and the content of calcium salts in the blood tends to increase, and it is apparently in cases where there is a deficiency of alkali salts or ions and a deficiency in phosphoric acid ions, together with an excess of calcium salts in the blood, that the calcium separates from solution in the blood and precipitates on or in the walls of the arteries.

Heretofore, so far as I am aware, no specific remedy has been devised for reversing the process of calcification and removing the precipitated calcium salts, particularly calcium phosphate, by which arteriosclerosis appears to be caused.

The present invention provides an improved composition in the form of a water solution adapted and intended for use by subcutaneous injection and which enables the process of calcification to be reversed and the deposited calcium phosphate to be redissolved and removed from the system.

The composition which I have devised is made up of the following ingredients and the following parts by weight:

| | |
|---|---|
| $Na_2HPO_4$, secondary sodium phosphate | 0.20 |
| $NaHCO_3$, sodium bicarbonate | 0.33 |
| $KCl$, potassium chloride | 0.35 |
| $NaCl$, sodium chloride | About 4.25 |
| Distilled water | 100.00 |

This composition is prepared under conditions which exclude the presence of calcium salts in it, as hereafter described, and it is enclosed in sealed ampules which maintain it in a sterile and calcium-free condition. It is injected subcutaneously in doses ranging from 0.5 to 3.0 cc.

While the weight of the blood is about 1/13 of the weight of the entire body, this amount of blood does not contain a large quantity of inorganic constituents. For example, in 100 cc. of normal blood, there is only about 0.005 gr. of phosphorus while the entire amount of blood contained in the body (around 5 liters), contains only about 0.25 gr. Similarly, in 100 cc. of normal blood there is only around 0.005 gr. to 0.010 gr. of calcium. It is with such minute amounts of inorganic salts that we are concerned in the human blood. Nevertheless, it appears that a disturbance of the normal proportion of calcium and alkali metal salts may result in the objectionable calcification or calcium deposit which causes hardening of the arteries or arteriosclerosis.

The improved composition of the present invention, although containing the alkali metal salt in seemingly insignificant amounts in the solution injected, nevertheless has an important influence in changing the composition of the blood so that the process of calcification is reversed, and the calcium deposits are dissolved and removed.

The improved composition contains the secondary sodium phosphate which supplies the phosphoric acid radical as well as sodium to the blood. It appears to be important to have a sufficient amount of the phosphoric acid radical present in proportion to the lime contained in the blood, so that the calcium phosphate will be kept in solution as the soluble acid calcium salt; and, when an excess of phosphoric acid radical is present in the blood, it appears to act upon the insoluble precipitated calcium phosphate to convert it into a soluble form so that it is removed and carried away in solution.

It is also important that the blood should contain sodium bicarbonate, but not sodium carbonate, which is a strong base and produces a powerful reaction and at times necrosis. Accordingly, I employ sodium bicarbonate in my composition. It is not decomposed by sterilization when in sealed ampules.

The presence of sulfates in the composition appears to be objectionable because of their tendency to form insoluble salts with calcium. Accordingly, I consider it desirable to omit sulfates from my composition.

Arteriosclerosis is commonly accompanied by acidosis. During the precesses of metabolism, acid products are formed which require alkali to combine with them for their prompt and effective removal, otherwise an acid condition results. The formation of such acid products tends to reduce the content of alkali metal salts. The new composition of the present invention supplies alkali salts which will combine with such acid products and increase the alkalinity of the blood. The new composition, although injected in small amounts, and containing apparently insignificant amounts of the alkali metal salts, nevertheless has been found to have a marked influence in overcoming acidosis and arteriosclerosis. The subcutaneous injection of the composition apparently acts by changing the precipitated calcium from an insoluble combination to a soluble combination and keeping it in solution so as to restore the calcium salt equilibrium. The injection of the composition increases the content of phosphoric acid ions ($PO_4$) in the blood and also supplies salts of alkali metals.

In preparing the new composition, it is important to avoid entirely the use of containers made of glass or other material containing calcium. Ordinary glass cannot be used because of the dissolving action of the solution on the glass, resulting in the dissolving of calcium from the glass containers. The presence of such dissolved calcium would defeat the purpose for which the composition is required. Accordingly, in preparing the composition, I use vessels of Jena glass or of porcelain or of other calcium-free material. I also use freshly prepared distilled water, which is also kept in containers of calcium-free glass, since the carbon dioxide dissolved in distilled water exposed to the air is sufficient to dissolve calcium from calcium-containing glass. By using freshly prepared distilled water which is put in containers of calcium-free glass and boiled, and by using vessels for making and storing the composition which are likewise made of calcium-free material, I am enabled to make the composition in a calcium-free condition so that its maximum calcium-dissolving properties are retained.

The composition cannot be sterilized by boiling in an open container because during such boiling sodium bicarbonate decomposes and is more or less converted into sodium carbonate which is objectionable in the composition. Accordingly, I use freshly distilled and boiled water and dissolve the alkali metal salts in it and then seal the composition in ampules of calcium-free glass and sterilize the composition in the ampules, each ampule containing, for example, 3.0 cc. of the composition. The composition is filtered before putting it into the ampules to insure that all suspended constituents are removed. After sealing in the ampules, the composition is sterilized by boiling for about fifteen minutes at a temperature of around 104 to 105° C. to insure a sterile condition and also to insure that the solution is free from salts of calcium which precipitates from the solution at the above temperature.

By preparing the composition in the manner above described and by enclosing it in sealed ampules of calcium-free glass, the activity of the solution and its valuable calcium-dissolving properties are retained. When the composition is to be used, the ampule is broken and the sterile solution is then employed as hereinbefore described, i. e. by subcutaneous injection.

I claim:

1. An improved composition for the treatment of arteriosclerosis comprising a solution in water of the following salts in about the following proportions:

$Na_2HPO_4$, secondary sodium phosphate_____ 0.20
$NaHCO_3$, sodium bicarbonate_____ 0.33
KCl, potassium chloride_____ 0.35
NaCl, sodium chloride_____ About 4.25
Distilled water_____ 100.00 said composition being enclosed in calcium-free containers.

2. The method of producing a composition adapted for the treatment of arteriosclerosis, which comprises dissolving in freshly distilled and calcium-free water, sodium phosphate, sodium bicarbonate and sodium and potassium chloride in about the following proportions:

$Na_2HPO_4$, secondary sodium phosphate_____ 0.20
$NaHCO_3$, sodium bicarbonate_____ 0.33
KCl, potassium chloride_____ 0.35
NaCl, sodium chloride_____ About 4.25
Distilled water_____ 100.00 protecting the solution from contact with calcium-containing containers, and enclosing the composition in sealed ampules of calcium-free glass and sterilizing the same in said ampules.

3. The method of producing a composition adapted for the treatment of arteriosclerosis, which comprises dissolving in freshly prepared distilled water free from calcium salts, the following salts in about the following proportions:

| | |
|---|---|
| $Na_2HPO_4$, secondary sodium phosphate | 0.20 |
| $NaHCO_3$, sodium bicarbonate | 0.33 |
| $KCl$, potassium chloride | 0.35 |
| $NaCl$, sodium chloride | About 4.25 |
| Distilled water | 100.00 | protecting the solution from contact with calcium-containing containers, sealing it in ampules of calcium-free glass and sterilizing the composition in the ampules.

In testimony whereof I affix my signature.

NICHOLAS A. RUMANCEFF.